(12) United States Patent
Koide et al.

(10) Patent No.: US 11,126,163 B2
(45) Date of Patent: Sep. 21, 2021

(54) NUMERICAL CONTROLLER

(71) Applicant: FANUC Corporation, Yamanashi (JP)

(72) Inventors: Naoya Koide, Yamanashi (JP); Jirou Fujiyama, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/902,926

(22) Filed: Jun. 16, 2020

(65) Prior Publication Data

US 2020/0401107 A1 Dec. 24, 2020

(30) Foreign Application Priority Data

Jun. 19, 2019 (JP) .............................. JP2019-114073

(51) Int. Cl.
*G05B 19/41* (2006.01)
(52) U.S. Cl.
CPC .... *G05B 19/41* (2013.01); *G05B 2219/34083* (2013.01)
(58) Field of Classification Search
None
See application file for complete search history.

(56) References Cited

U.S. PATENT DOCUMENTS

| 5,854,544 A * | 12/1998 | Speth ................... G05B 19/416 318/270 |
| 6,539,275 B1 | 3/2003 | Mizuno et al. |
| 2020/0133241 A1* | 4/2020 | Uenishi ............. G05B 19/4155 |

FOREIGN PATENT DOCUMENTS

| JP | 07191728 A | 7/1995 |
| JP | 11338530 A | 12/1999 |

* cited by examiner

*Primary Examiner* — Ryan A Jarrett
(74) *Attorney, Agent, or Firm* — RatnerPrestia

(57) ABSTRACT

A numerical controller suppresses change of a axis speed to be slow even when a lookahead distance varies with small steps. The numerical controller includes: a lookahead unit that looks ahead a plurality of instruction blocks from an NC program; an analysis unit that analyzes the looked ahead instruction blocks and creates motion instruction data; a target speed calculation unit that calculates a target speed of the axis based on a lookahead distance; an interpolation unit that generates interpolation data based on the motion instruction data and the target speed; and a servo control unit that controls a motor based on the interpolation data. The target speed calculation unit refrains from recalculation of the target speed when a change of the lookahead distance is within a margin.

1 Claim, 4 Drawing Sheets

NUMERICAL CONTROLLER

RELATED APPLICATION

The present application claims priority to Japanese Application Number 2019-114073 filed Jun. 19, 2019, the disclosure of which is hereby incorporated by reference herein in its entirety.

BACKGROUND OF THE INVENTION

1. Field of the Invention

The present invention relates to a numerical controller.

2. Description of the Related Art

A numerical controller reads and analyzes instruction blocks sequentially that are instructed by an NC program and creates executable data so that optimal acceleration and deceleration are to be performed during machining. Looking ahead (Prefetching) such instruction blocks, the numerical controller creates execution data with taking instruction blocks performed later into consideration. The numerical controller then interpolate the execution data by an interpolation process unit, so it can output a motion instruction to a control unit of a servo motor that drives each axis (for example, see Japanese Patent Application Publication No. H11-338530, Japanese Patent Application Publication No. H07-191728, and the like). When looking ahead such instruction blocks, the numerical controller calculates the upper limit speed at which an axis can be safely stopped within a range of the distance through which the axis moves in accordance with instructions provided by the looked ahead instruction blocks (hereinafter, referred to as "lookahead distance". This enables the numerical controller to control the axis speed without exceeding the upper limit speed.

When the numerical controller performs speed control through looked ahead instruction blocks and there is a section where small blocks of a short motion distance appear continuously in an NC program, the lookahead distance becomes shorter. The upper limit speed is then calculated so that the axis can be safely stopped at the short distance. Thus, the axis motion speed is decelerated. Then, when a block of motion distance longer than the small block is looked ahead, the lookahead distance becomes longer. The upper limit speed is calculated so that the axis can be safely stopped at a longer lookahead distance. Thus, the axis motion speed is accelerated.

As discussed above, in the numerical controller that performs speed control in accordance with lookahead processing, when instruction block groups of different distance appear repeatedly at a predetermined frequency, the axis speed fluctuates. Further, such fluctuation of the axis speed occurs during machining of a workpiece, finishing of the machined surface of the workpiece becomes uneven, and the quality of the machined surface degrade. Such a phenomenon is more likely to occur when number of axes of a machine tool are to be controlled, when a processing load such as an option configuration of a machine tool is high, or the like.

SUMMARY OF THE INVENTION

Accordingly, there is a demand for a technology for suppressing fluctuation of the axis speed to be slow even when the lookahead distance varies with small steps.

A numerical controller according to one aspect of the present invention sets a target speed in accordance with a lookahead distance when performing speed control based on the lookahead distance. The numerical controller according to one aspect of the present invention performs control to decelerate the target speed when the lookahead distance is insufficient and accelerate the target speed when the lookahead distance is sufficient. The numerical controller suppresses speed fluctuation by providing a margin between a lookahead distance considered to be sufficient and a lookahead distance considered to be insufficient when performing the control.

Further, one aspect of the present invention is a numerical controller that controls a machine based on an NC program, and the machine has at least one axis and machines a workpiece by driving the axis to move a tool relatively to the workpiece. Further, the numerical controller includes: a lookahead unit that looks ahead a plurality of instruction blocks from the NC program; an analysis unit that analyzes the plurality of instruction blocks looked ahead by the lookahead unit and creates motion instruction data used for driving the axis; a target speed calculation unit that calculates a target speed of the axis based on a lookahead distance that is a distance by which the axis moves in accordance with an instruction provided by the plurality of instruction blocks looked ahead by the lookahead unit; an interpolation unit that generates interpolation data based on the motion instruction data and the target speed; and a servo control unit that, based on the interpolation data, controls a motor configured to drive the machine.

Further, the target speed calculation unit of the numerical controller refrains from recalculation of the target speed when the lookahead distance changes and the change is within a predetermined margin defined in advance.

According to one aspect of the present invention, it is possible to suppress fluctuation caused by repetition of deceleration and acceleration due to insufficient lookahead distance and maintain a good machined surface.

BRIEF DESCRIPTION OF THE DRAWINGS

The above and other objects and the features of the present invention will be apparent from description of the following embodiments with reference to the attached drawings, in which.

DETAILED DESCRIPTION OF THE PREFERRED EMBODIMENTS

Embodiments of the present invention will be described with reference to the attached drawings.

Figure 1:
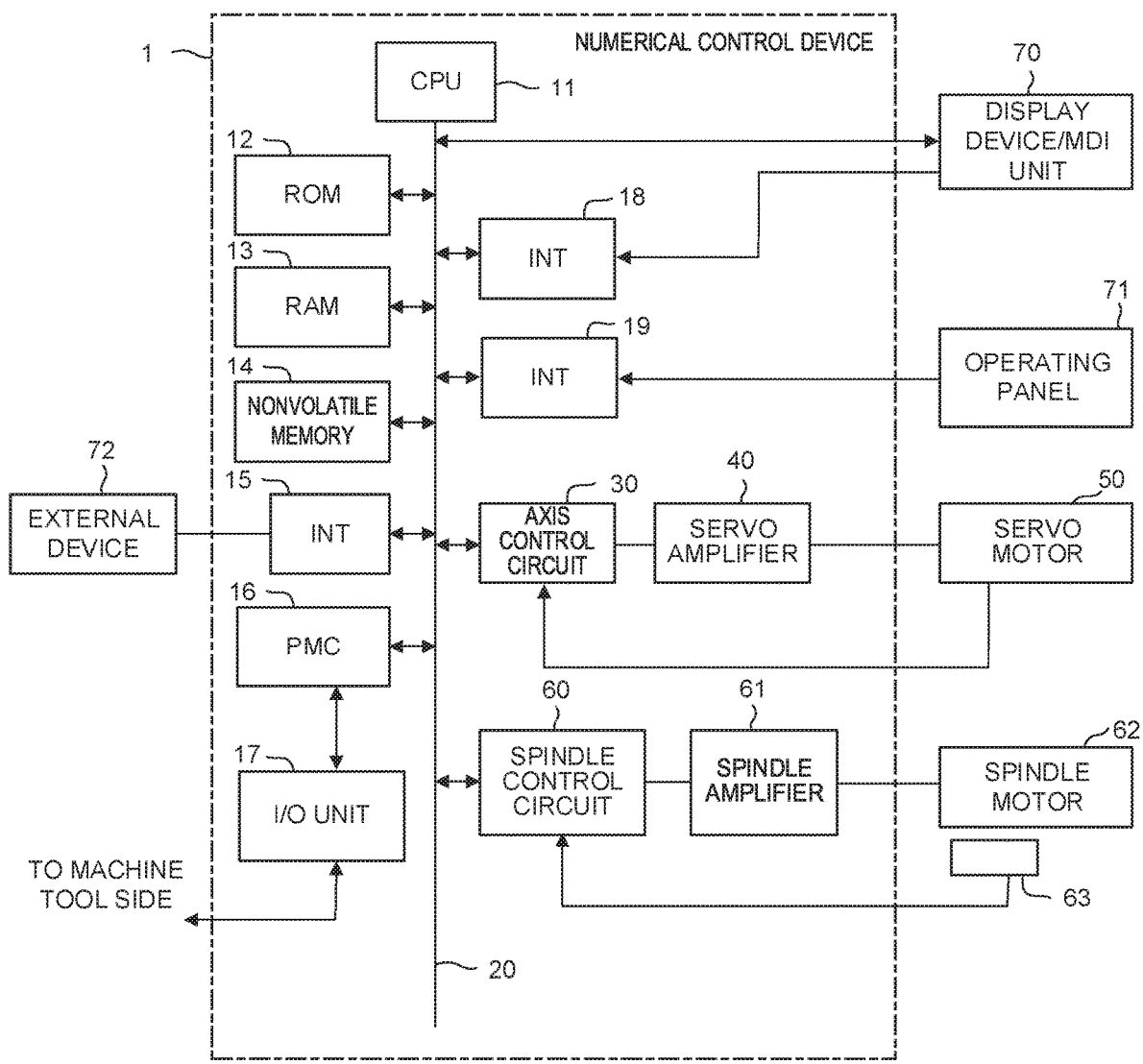
FIG. 1 is a schematic block diagram of the hardware of a numerical controller of an embodiment of the present invention.

FIG. 1 is a schematic diagram illustrating hardware configuration of a main part of a numerical controller according to one embodiment of the present invention. A numerical controller 1 of the present invention can be implemented as a numerical controller that controls a machine tool based on an NC program, for example.

A CPU 11 included in the numerical controller 1 of the present embodiment is a processor that generally controls the numerical controller 1. The CPU 11 reads a system program stored in a ROM 12 via a bus 20 and controls the overall numerical controller 1 in accordance with the system program. A RAM 13 temporarily stores temporary calculation data or display data, various data input externally, and the like.

A nonvolatile memory 14 is comprised of a battery backed up memory or a solid state drive (SSD), or the like, and a storage state thereof is maintained even when the numerical controller 1 is powered off. The nonvolatile memory 14 stores an NC program loaded from an external device 72 via an interface 15, an NC program input via a display device/MDI unit 70, or the like. The NC program or various data stored in the nonvolatile memory 14 may be loaded to and deploy in the RAM 13 upon executed. Further, various system programs such as a known analysis program or the like are written in the ROM 12 in advance.

The interface 15 is an interface used for connecting the CPU 11 of the numerical controller 1 to the external device 72 such as a USB device. A program, various parameters, or the like used for control of a machine tool is loaded from the external device 72 side. Further, the NC program, various parameters, or the like edited inside the numerical controller 1 can be stored in an external storage unit via the external device 72. A programmable machine controller (PMC) 16 outputs a signal to a machine tool and a peripheral device thereof (for example, a tool changer, an actuator such as a robot, a sensor attached to the machine tool, or the like) via an I/O unit 17 in accordance with a sequence program installed in the numerical controller 1 and controls the machine tool and the peripheral device thereof. Further, the PMC 16 receives a signal from various switches on an operating panel, peripheral devices, or the like equipped to a main body of a machine tool, performs necessary signal processing thereon, and then passes the processed signal to the CPU 11.

The display device/MDI unit 70 is a manual data input device including a display, a keyboard, or the like. An interface 18 receives an instruction or data from a keyboard of the display device/MDI unit 70 and passes the instruction or the data to the CPU 11. An interface 19 is connected to a control panel 71 including a manual pulse generator or the like used when manually driving each axis.

A axis control circuit 30 used for controlling an axis provided in a machine tool receives an instruction on motion amount of the axis from the CPU 11 and outputs the instruction to a servo amplifier 40. The servo amplifier 40 receives such an instruction and drives a servo motor 50 that moves the axis provided in the machine tool. The servo motor 50 of the axis has a built-in position/speed detector and feeds a position/speed feedback signal from the position/speed detector back to the axis control circuit 30 to perform feedback control of the position/speed. Note that, although the hardware configuration diagram of FIG. 1 illustrates only a single axis control circuit 30, a single servo amplifier 40, and a single servo motor 50, each of these components is provided for the number of axes provided in a machine tool to be controlled in the actual implementation. For example, when a machine tool having two blade stages is controlled as with the embodiment of the present invention, two sets of the axis control circuits 30, the servo amplifiers 40, and the servo motors 50 that drive a first blade stage having an first tool attached thereto in the X-axis and Z-axis directions, respectively, and two sets of the axis control circuits 30, the servo amplifiers 40, and the servo motors 50 that drive the second blade stage having a second tool attached thereto in the X-axis and Z-axis directions, respectively, are provided in the numerical controller 1.

A spindle control circuit 60 receives a spindle rotation instruction and outputs a spindle speed signal to a spindle amplifier 61. The spindle amplifier 61 receives the spindle speed signal and rotates the spindle motor 62 of a machine tool at the instructed rotational rate to drive a tool. A position coder 63 is coupled to the spindle motor 62, the position coder 63 outputs feedback pulses in synchronization with rotation of a main axis, and the feedback pulses are read by the CPU 11.

Figure 2:
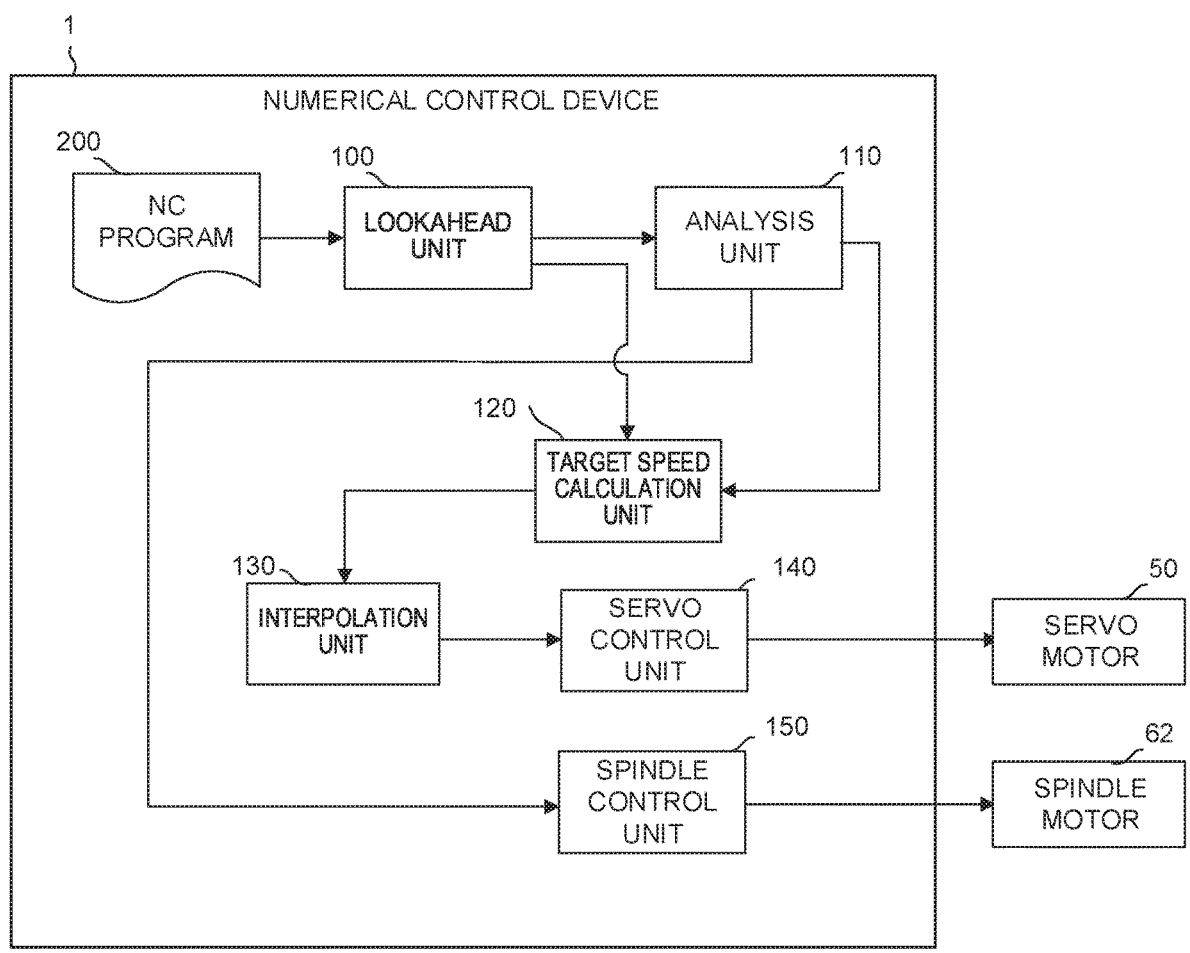
FIG. 2 is a schematic block diagram of the function of the numerical controller according to one embodiment.

FIG. 2 is a schematic block diagram of the function of the numerical controller 1 according to one embodiment of the present invention. Each function block illustrated in FIG. 2 is implemented when the CPU 11 provided in the numerical controller 1 illustrated in FIG. 1 executes a system program to control the operation of each component of the numerical controller 1.

The numerical controller 1 of the present embodiment includes a lookahead unit 100, an analysis unit 110, a target speed calculation unit 120, an interpolation unit 130, a servo control unit 140, and a spindle control unit 150. Further, the nonvolatile memory 14 of the numerical controller 1 pre-stores an NC program 200 used for performing control to drive a spindle having a tool attached thereto relatively to a workpiece to machine the workpiece.

The lookahead unit 100 is implemented through the execution of a system program read from the ROM 12 by the CPU 11 provided in the numerical controller 1 illustrated in FIG. 1 and through the process using the RAM 13 or the nonvolatile memory 14 performed mainly by the CPU 11. The lookahead unit 100 lookaheads one or more instruction blocks of the NC program 200 and stores the instruction blocks in a lookahead buffer (not illustrated) provided on a memory device such as the RAM 13. The lookahead unit 100 may lookahead a certain number of instruction blocks that can be stored in the capacity of the lookahead buffer, from the NC program 200. Further, the lookahead unit 100 may lookahead instruction blocks of a number preset in a setting area provided on the nonvolatile memory 14, from the NC program 200.

The analysis unit 110 is implemented through the execution of a system program read from the ROM 12 by the CPU 11 provided in the numerical controller 1 illustrated in FIG. 1 and through a the process using the RAM 13 or the nonvolatile memory 14 performed mainly by the CPU 11. The analysis unit 110 analyzes instruction blocks looked ahead from the NC program 200 by the lookahead unit 100 and creates motion instruction data for a servo motor that drives each axis of a machine tool or spindle instruction data for instructing the rotational rate of the spindle of the machine tool. The analysis unit 110 creates motion instruction data for the servo motor 50 that drives each axis of the machine tool based on a feed instruction instructed by the looked-ahead instruction block. Further, the analysis unit 110 generates spindle instruction data based on a spindle rotation instruction instructed by the looked ahead instruction block. The motion instruction data analyzed and created by the analysis unit 110 is output to the target speed calculation unit 120. Further, the spindle instruction data analyzed and created by the analysis unit 110 is output to the spindle control unit 150.

The target speed calculation unit 120 is implemented execution of a system program read from the ROM 12 by the CPU 11 provided in the numerical controller 1 illustrated in FIG. 1 and through the process using the RAM 13 or the nonvolatile memory 14 performed mainly by the CPU 11. The target speed calculation unit 120 calculates a target speed based on a lookahead distance that is a distance through which the axis moves in accordance with a plurality of instruction blocks looked ahead by the lookahead unit 100. The target speed calculation unit 120 basically calculates, as the target speed, a speed from which the axis can be stopped safely within a range of the lookahead distance. The target speed calculation unit 120 refrains from recalculation of increase or decrease of the target speed until the lookahead distance changes exceeding a predetermined margin, such as when looking-ahead of instruction blocks performed by the lookahead unit 100 advances, when the instruction block to be executed advances, or the like. For example, when the lookahead distance increases within a range of the predetermined margin, the target speed calculation unit 120 may refrain from recalculation so that the target speed does not increase. When the lookahead distance decreases within a range of the predetermined margin, the target speed calculation unit 120 may refrain from recalculation so that the target speed does not decrease. Further, when the lookahead distance increases and decreases within a range of the predetermined margin, the target speed calculation unit 120 may refrain from recalculation so that the target speed neither increases nor decreases.

Figure 3:
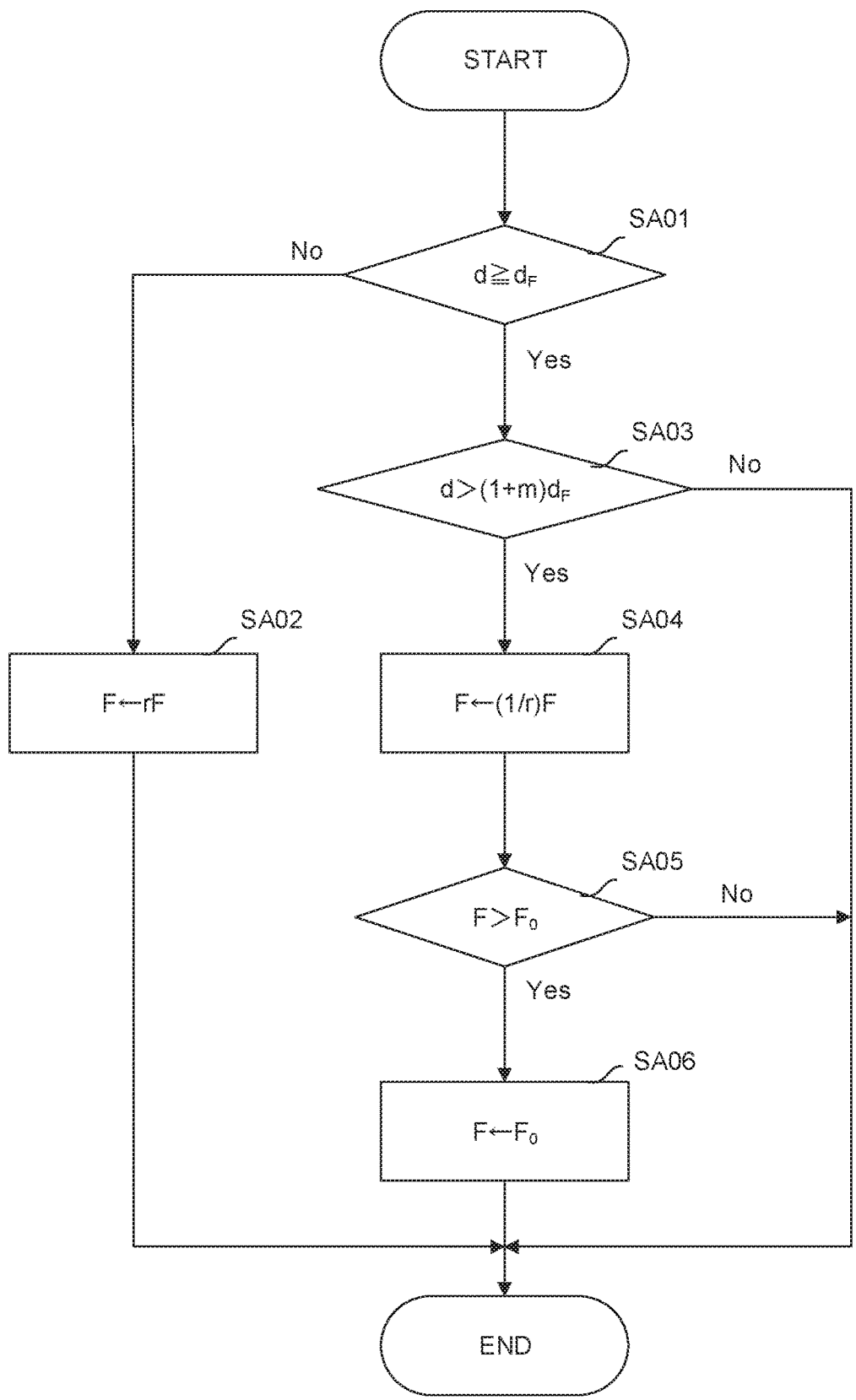
FIG. 3 is a flowchart schematically illustrating an example of a target speed calculation procedure.

FIG. 3 is a flowchart schematically illustrating a calculation procedure performed by the target speed calculation unit 120 for a target speed F based on a lookahead distance d. The flowchart of FIG. 3 illustrates, as an example, a flow of a calculation process in which the target speed calculation unit 120 refrains from recalculation so that the target speed does not increase when the lookahead distance increases within a range of a predetermined margin. The process illustrated in the flowchart of FIG. 3 is performed when the target speed is to be changed, such as when the lookahead of instruction blocks performed by the lookahead unit 100 advances, when the instruction block to be executed advances, or the like, for example.

[Step SA01] The target speed calculation unit 120 determines whether or not the current lookahead distance d is greater than or equal to a distance dF at which stopping from the currently set target speed F is possible. If the lookahead distance d is greater than or equal to the stoppable distance dF, the process proceeds to step SA03, and if the lookahead distance d is less than the stoppable distance dF, the process proceeds to step SA02.

[Step SA02] The target speed calculation unit 120 sets, as a new target speed F, a value obtained by multiplying the currently set target speed F by a predefined reduction rate r ($0<r<1$) and ends the process in this flowchart.

[Step SA03] The target speed calculation unit 120 determines whether or not the current lookahead distance d is greater than a value obtained by multiplying the stoppable distance dF by (1+a predetermined margin m defined in advance). If the current lookahead distance d is greater than (1+m)×dF, the process proceeds to step SA04, and otherwise ends the process of this flowchart without recalculating the target speed F.

[Step SA04] The target speed calculation unit 120 sets, as a new target speed F, a value obtained by dividing the currently set target speed F by a predefined reduction rate r ($0<r<1$).

[Step SA05] The target speed calculation unit 120 determines whether or not the new target speed F set in step SA04 is greater than an instructed speed F0 instructed by motion instruction data. If the new target speed F is greater than the instructed speed F0, the process proceeds to step SA06, and otherwise, the process of this flowchart ends.

[Step SA06] The target speed calculation unit 120 clamps the new target speed F at the instructed speed F0 (sets the instructed speed F0 as the new target speed F). In the flowchart illustrated as an example in FIG. 3, with respect to the margin m for a lookahead distance or the reduction rate r of the target speed F, an experiment or the like may be performed in advance, a value which results in a suitable target speed so that no fluctuation occurs is derived, and the derived value may be set. In the applicants' experiment environment, it has been confirmed that stable speed control can be performed when the margin m for a lookahead distance is set to around 0.1 and the reduction rate r of the target speed F is set to around 0.9, for example.

The interpolation unit 130 is implemented through execution of a system program read from the ROM 12 by the CPU 11 provided in the numerical controller 1 illustrated in FIG. 1 and through a process using the RAM 13 or the nonvolatile memory 14 is performed mainly by the CPU 11. The interpolation unit 130 creates interpolation data in which points on an instruction path instructed by the motion instruction data are interpolated and calculated at an interpolation cycle (control cycle) based on the motion instruction data created by the analysis unit 110 and the target speed F calculated by the target speed calculation unit 120. The interpolation process at the interpolation unit 130 is performed every interpolation cycle (control cycle). The interpolation unit 130 creates interpolation data used for driving the servo motor 50 so that the motion speed of the tool relative to a workpiece is closer to the target speed F.

The servo control unit 140 is implemented through execution of a system program read from the ROM 12 by the CPU 11 provided in the numerical controller 1 illustrated in FIG. 1 and through a process using the RAM 13 or the nonvolatile memory 14 performed mainly by the CPU 11, and through a control process of the servo motor 50 performed by the axis control circuit 30 and the servo amplifier 40. Based on the interpolation data created by the interpolation unit 130, the servo control unit 140 controls the servo motor 50 that drives each axis of the machine tool.

The spindle control unit 150 is implemented through the execution of a system program read from the ROM 12 by the CPU 11 provided in the numerical controller 1 illustrated in FIG. 1, through a process using the RAM 13 or the nonvolatile memory 14 performed mainly by the CPU 11, and through a control process of the spindle motor 62 performed by the spindle control circuit 60 and the spindle amplifier 61. Based on the main axis instruction data created by the analysis unit 110, the spindle control unit 150 controls the spindle motor 62 that rotates the spindle of the machine tool to be controlled.

Figure 4:
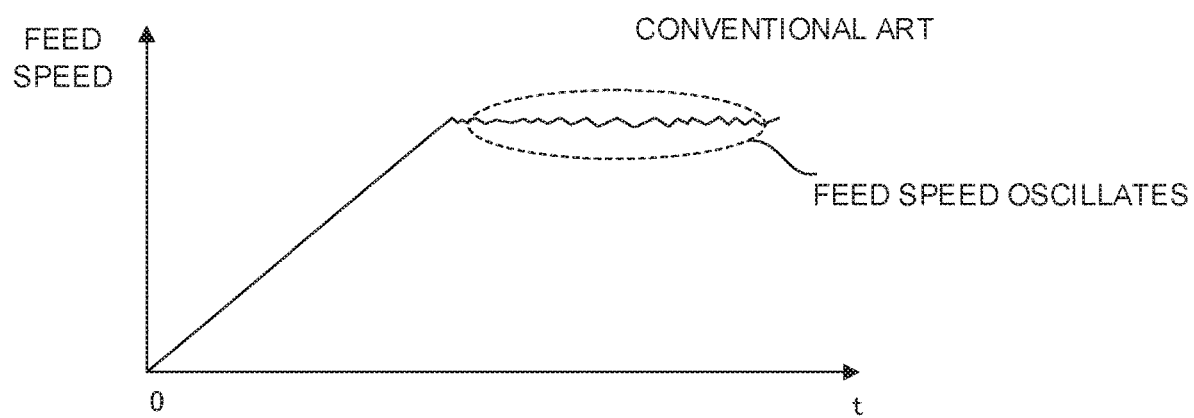
FIG. 4 is graphs illustrating an example of temporal change in a feed speed according to a conventional scheme and a proposed scheme of the present invention.
Figure 4:
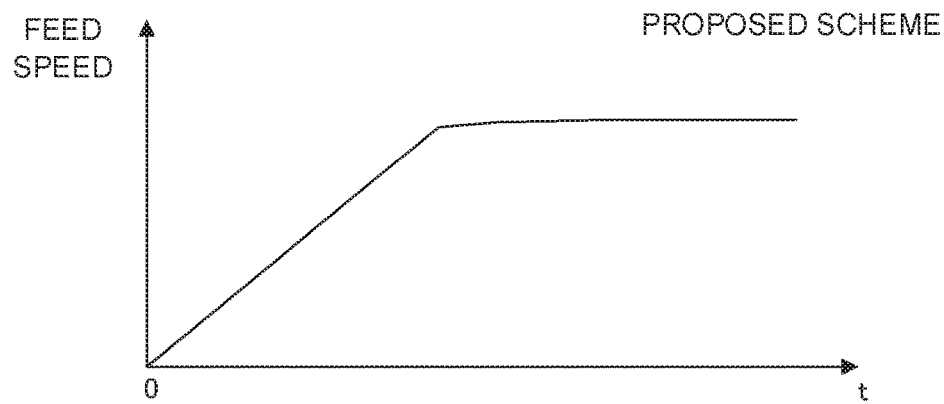

FIG. 4 is a graph schematically illustrating a change in the feed speed when speed control in accordance with the conventional art is performed and a change in the feed speed when speed control in accordance with the proposed scheme of the present invention is performed. As illustrated in FIG. 4 as an example, in the conventional scheme, fluctuation of the feed speed may occur, for example, deceleration occurs before the instructed speed F0 is reached when the lookahead distance d becomes shorter due to a factor such as continuous occurrence of small blocks, and acceleration then occurs when the lookahead distances d start more accumulating. In the speed control in accordance with the proposed scheme of the present invention, the target speed F is maintained when the lookahead distance d changes within the predetermined margin m, and the target speed F is recalculated based on the lookahead distance d when the lookahead distance d changes exceeding the predetermined margin m. Thus, since the target speed F is not changed when the lookahead distance changes with small steps, the oscillation of the feed speed is suppressed and stably changed.

As described above, with speed control being performed in accordance with the proposed scheme of the present invention, the feed speed of a tool with respect to a workpiece during machining stably changes. Therefore, grade of the machined surface of a workpiece is stabilized, and machining quality is expected to be maintained.

Although the embodiments of the present invention have been described above, the present invention is not limited to only the examples in the embodiments described above and can be implemented in various forms by adding appropriate modification.

The invention claimed is:

1. A numerical controller that controls a machine tool based on an NC program, wherein the machine tool is adapted to drive an axis thereof to displace a tool relative to a workpiece and configured to machine the workpiece, the numerical controller comprising:
    a lookahead unit that looks ahead a plurality of instruction blocks from the NC program;
    an analysis unit that analyzes the plurality of instruction blocks looked ahead by the lookahead unit and creates motion instruction data for driving the axis;
    a target speed calculation unit that calculates a target speed of the axis based on a lookahead distance through which the axis is to be moved in accordance with an instruction provided by the plurality of instruction blocks looked ahead by the lookahead unit;
    an interpolation unit that generates interpolation data based on the motion instruction data and the target speed; and
    a servo control unit that, based on the interpolation data, controls a motor configured to drive the machine tool,
    wherein the target speed calculation unit refrains from recalculation of the target speed when the lookahead distance changes and the change of the distance is within a predetermined margin defined in advance.

* * * * *